United States Patent [19]
Rubel et al.

[11] Patent Number: 5,251,662
[45] Date of Patent: Oct. 12, 1993

[54] DEVICE TO EQUALLY DISTRIBUTE THE VAPOR AND LIQUID PHASES DURING WET STEAM FLOW THROUGH BRANCH TEE JUNCTIONS

[75] Inventors: Mark T. Rubel, Houston; James R. Stoy, Missouri City, both of Tex.

[73] Assignee: Texaco Inc., White Plains, N.Y.

[21] Appl. No.: 962,554

[22] Filed: Oct. 19, 1992

[51] Int. Cl.[5] .............................. F16K 11/00
[52] U.S. Cl. ..................... 137/875; 137/561 A
[58] Field of Search .......... 137/561 A, 875; 138/37

[56] References Cited

U.S. PATENT DOCUMENTS

| | | | |
|---|---|---|---|
| 2,114,653 | 4/1938 | Danel | 137/875 X |
| 3,080,884 | 3/1963 | Nelson et al. | 137/875 X |
| 4,269,211 | 5/1981 | Howard et al. | 137/559 X |
| 4,354,528 | 10/1982 | McAndrew | 137/875 |
| 4,824,614 | 4/1989 | Jones | 138/37 X |
| 5,165,450 | 11/1992 | Marrelli | 137/875 |

Primary Examiner—John C. Fox
Attorney, Agent, or Firm—James L. Bailey; Jack H. Park; Russell J. Egan

[57] ABSTRACT

Steam quality at both outlets of a T junction is maintained equal to that of the inlet by variably controlling the pipe cross sectional area according to the ratio of vapor flow rates through the respective outlet legs.

7 Claims, 3 Drawing Sheets

DEVICE TO EQUALLY DISTRIBUTE THE VAPOR AND LIQUID PHASES DURING WET STEAM FLOW THROUGH BRANCH TEE JUNCTIONS

BACKGROUND OF THE INVENTION

1. The Field of Invention

The present invention concerns a method and apparatus for equally dividing vapor and liquid phases of wet steam at T junctions.

2. The Prior Art

In most steam flow situations, in which wet steam from a source or generator is distributed through a pipe network to various users, there is a phenomenon known as "Phase Splitting". This means that the liquid and vapor phases of the steam separate with the lighter vapor generally moving axially within the pipe at high velocity and the heavier liquid becoming annular and forming a liquid film which travels along the inside wall of the pipe. Thus the liquid is substantially evenly distributed around the internal circumference of the pipe. When such phase-separated steam encounters a pipe junction, such as a T junction used to distribute the steam to different locations for use, the result may be steam of differing quality exiting the respective arms of the junction. In a large steam system the wet steam flow may encounter many T junctions before finally being utilized. Phase spitting compounds itself and, in the worst case, results in some portions of a system receiving as much as 100 percent vapor whereas other portions of the system receive as much as 100 percent liquid.

Since most existing distribution systems suffer from the problem of phase splitting, a simple and inexpensive device to eliminate phase splitting, without having to redesign the entire steam distribution system, is greatly needed. One commercially available device, see U.S. Pat. No. 4,824,614, the disclosure of which is incorporated herein by reference, claims to substantially eliminate problems associated with phase splitting in a branch T junction. A branch T junction is one in which a portion of the incoming flow is taken off through an outlet having an axis extending normal to the axis of the inlet, and the remaining flow continues straight through the junction to a second outlet, as opposed to an impacting T junction where the incoming flow is split between two coaxial and oppositely directed outlet branches. This prior art device only succeeds in eliminating phase splitting in a branching T junction when the inlet mass is equally split between downstream legs of the T junction; that is 50 percent of the inlet mass is extracted in each outlet leg of the T junction. All other mass extraction ratios result in phase splitting. Most T junctions in a steam system operate at conditions other than a mass extraction ratio of 50 percent, therefore, phase splitting would still be present at most junctions.

This prior art device includes a horizontal "static mixer" spool installed at the inlet of the T. Theoretically, the fluid exits the mixer spool as a "homogeneous" mixture. The mixture then enters a "flow stratifier" section which includes several vertical layers of alternate flow division chambers to reduce the establishment of secondary flow currents. Finally, the mixture encounters a "dividing wall" which guides the flow to its appropriate downstream outlet.

The reason the device only works at an extraction ratio of 50 percent is thought to be a result of equal pipe cross sectional areas (50 percent each) allocated at the dividing wall. If the flow is truly homogeneous after the static mixer, then the liquid phase is evenly distributed throughout the vapor phase. If for example, 20 percent of the vapor is taken off into the branch leg of the T junction, 20 percent of the liquid phase must be also taken off in order to result in a branch steam quality (and run steam quality) equal to the inlet steam quality. In order for this to occur, 20 percent of the pipe cross sectional area must be allocated to the branch side of the dividing wall. The reason for this is because as the two-phase mixture passes through the inlet static mixer, the liquid phase is accelerated into the vapor phase and is evenly distributed throughout the vapor phase. With the acceleration of the liquid phase comes an increase in the momentum of the liquid phase. It is extremely difficult for the high momentum liquid to be taken off 90 degrees into the branch leg of the T junction. The concept of the dividing wall allows one to take off liquid into the branch, however, since the flow cross sectional area is fixed at 50 percent, the fraction of liquid that will be taken off into the branch remains relatively constant at approximately 50 percent. Slight variations may be attributed to the interfacial drag forces imposed on the liquid phase by the vapor phase.

Another patented device, see U.S. Pat. No. 4,269,211, the disclosure of which is incorporated herein by reference, claims to substantially eliminate problems associated with phase splitting in a T branch junction. This device uses a retractable, circular, perforated disc to divert the flow of liquid into the branch of the T. The disc is inserted into the center of the T along the axis of the branch. The device is unsuccessful in diverting the liquid phase of the steam into the branch because the disc is in contact with the wall of the T junction for only half of the pipe's circumference. Because the liquid phase of the steam is generally distributed as a circumferential film in contact with the wall of the pipe, the disc can influence only half of the liquid in the steam stream. Further, the perforations in the disc allow that portion of the liquid which may be diverted to the branch outlet to be blown through the perforations toward the run outlet thus further reducing the performance of the device.

SUMMARY OF THE INVENTION

The present invention concerns a device that can be used to equally distribute the vapor and liquid components of wet steam to each downstream leg of a branching or impacting T junction; that is, the steam qualities at both outlets of the T junction are equal to the steam quality at the inlet. This device will correct for the shortcomings of the above discussed prior art by providing variable pipe cross sectional area which will be allocated to the outlet legs of the junction according to the ratio of vapor flow rates through the respective outlet legs. This area will be adjusted according to the fraction of the incoming vapor phase that is required to be taken off into one of the outlet legs.

BRIEF DESCRIPTION OF THE DRAWINGS

The present invention will now be described, by way of example applied to a branch T junction, with reference to the accompanying drawings in which.

DETAILED DESCRIPTION OF A PREFERRED EMBODIMENT

Figure 1:
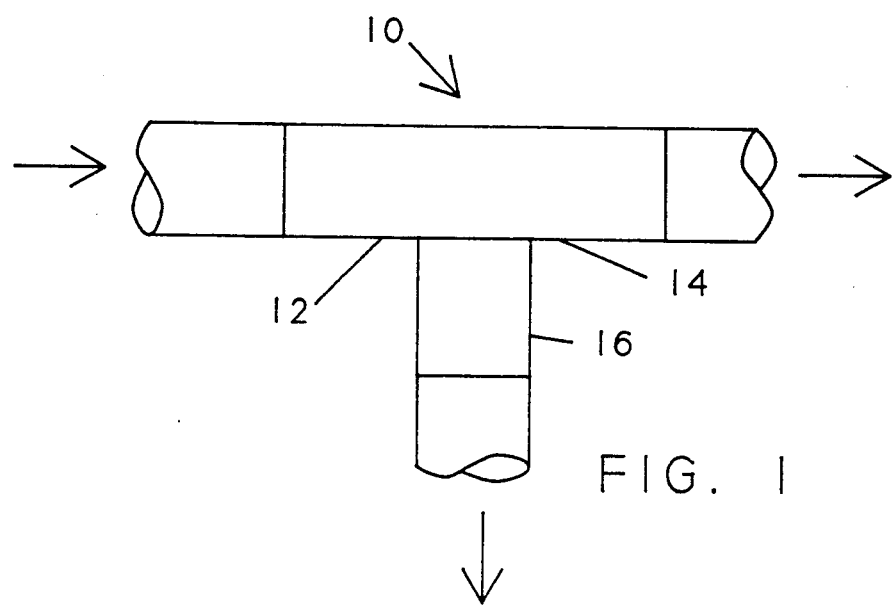
FIG. 1 is a diagrammatic view of a T branch Junction.
Figure 2:
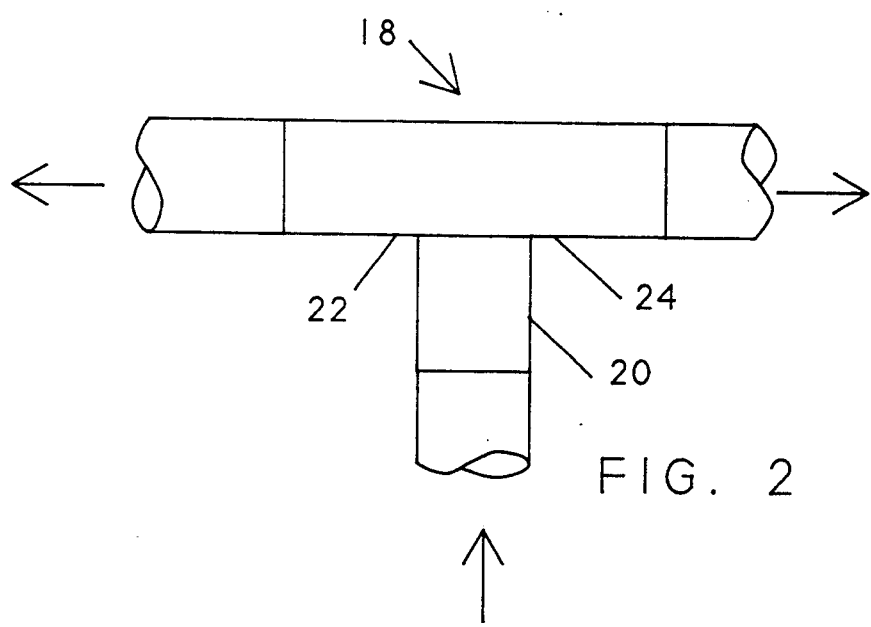
FIG. 2 is a diagrammatic view of a T impacting Junction.

FIG. 1 shows typical branch T junction 10 having an inlet 12, run outlet 14, and branch outlet 16, having an axis extending normal to the inlet/run axis of the junction. FIG. 2 shows a typical impact T junction 18 with inlet 20 having its axis normal to that of coaxial outlets 22, 24.

Figure 3:
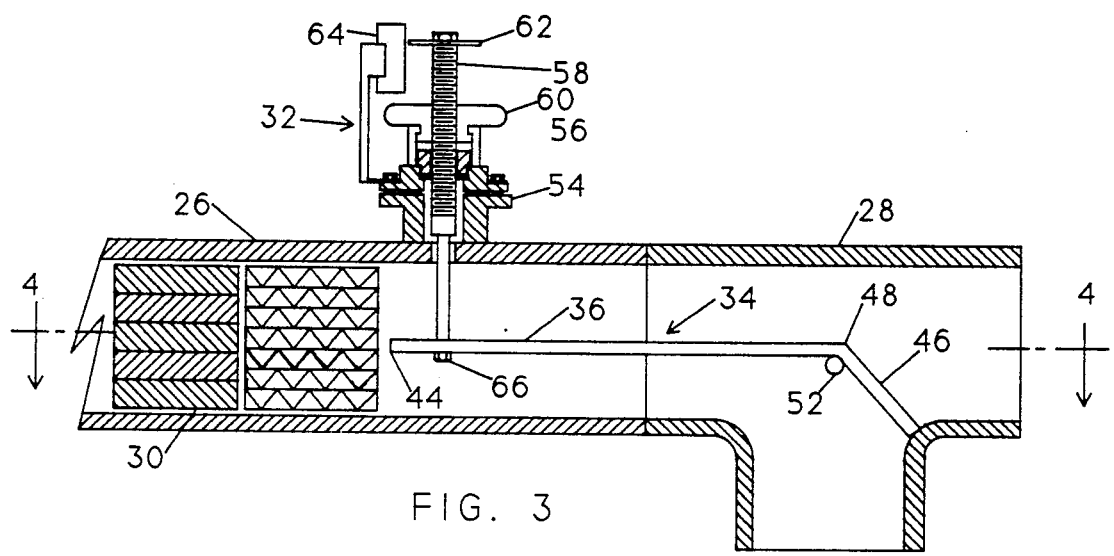
FIG. 3 is a vertical section, taken along line 3—3 of FIG. 4, showing an embodiment of the present invention which uses a static mixer.
Figure 4:
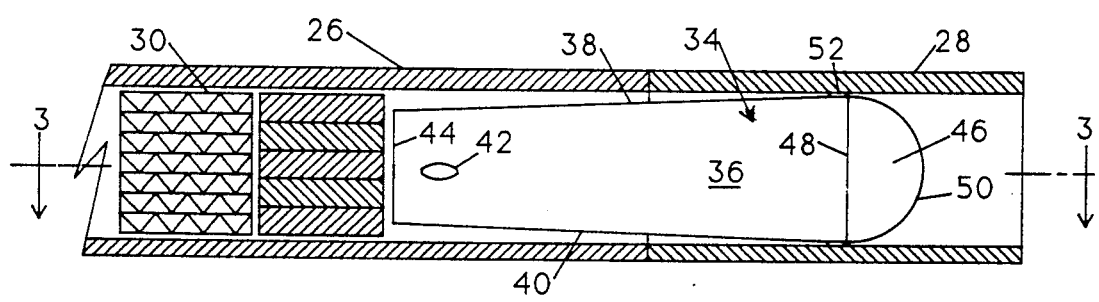
FIG. 4 is a horizonal section taken along line 4—4 of FIG. 3.

An embodiment of the present invention will now be described with reference to FIGS. 3 and 4 wherein an end portion of a feed pipe 26 is connected to a branch T-junction 28. The feed pipe 26 is provided with at least one static mixer element 30, here shown as a two element KOCH model SMV mixer.

Similar mixers are shown in U.S. Pat. Nos. 3,599,943; 3,785,620; and 4,062,524, the disclosures of which are incorporated herein by reference. Mounted on and extending normal to the feed pipe 26 is a bonnet assembly 32 of the type generally associated with rising stem gate valves. The bonnet assembly 32 is connected to control the position of deflector plate 34. The deflector plate 34, which is shown in plan view in FIG. 4, has a generally rectangular rigid member 36 with tapering longitudinal sides 38, 40, an elliptical control hole 42 towards upstream end 44 and a director member 46 extends from downstream end 48 at an angle from the plane of member 36. Director member 46 has a curved free edge 50 conforming to the shape of the junction which receives it. The deflector plate 34 is mounted in the junction 28 by a horizontally extending pivot means 52 fixed at the intersection of members 36 and 46. The bonnet assembly 32 comprises a housing 54 mounted on and extending radially from the feed pipe 26. The housing includes packing means 56 and a screw threaded stem 58 which is caused to move radially in and out of the feed pipe 26 by rotating hand wheel 60. The stem 58 has a position indicator 62 mounted on its upper free end in proximity to a position index plate 64. The lower end of stem 58 is fixed to the deflector plate 34 by bolt 66 passing through hole 42.

The incoming flow first passes through a static mixer 30 located in the inlet section 26. The homogeneous mixture of liquid and vapor leaving the static mixer is then separated into two components according to the variable area as determined by the setting of deflector plate 34. This divider plate is preferably a rigid steel plate fitted inside of the inlet section 26 and the T junction 28 with only sufficient clearance for rotation about pivot means 52. Only one suitable plate configuration has been shown. Other configurations which provide means to vary the cross sectional area of a pipe could also be used. The position of the deflector plate 34 will depend upon the fraction of the incoming vapor mass rate that is required to be taken off into the branch leg of the T junction 28. The bonnet assembly 32 is used to adjust the setting of the deflector plate 34, and hence, the required cross sectional flow area to cause the liquid mass fraction to equal the vapor mass fraction. At an extraction ratio of 50 percent, for example, the flow area would be 50 percent and the deflector plate 34 would be positioned with its upstream end substantially centered in the inlet pipe 26. At an extraction ratio of 30 percent, however, the position of the upstream end of deflector plate 34 would be adjusted by the bonnet assembly 32 such that the cross sectional flow area would be equal to 30 percent. A precalibrated index scale 64 on the bonnet assembly 32 is used to determine the precise required setting of the deflector plate 34.

Figure 5:
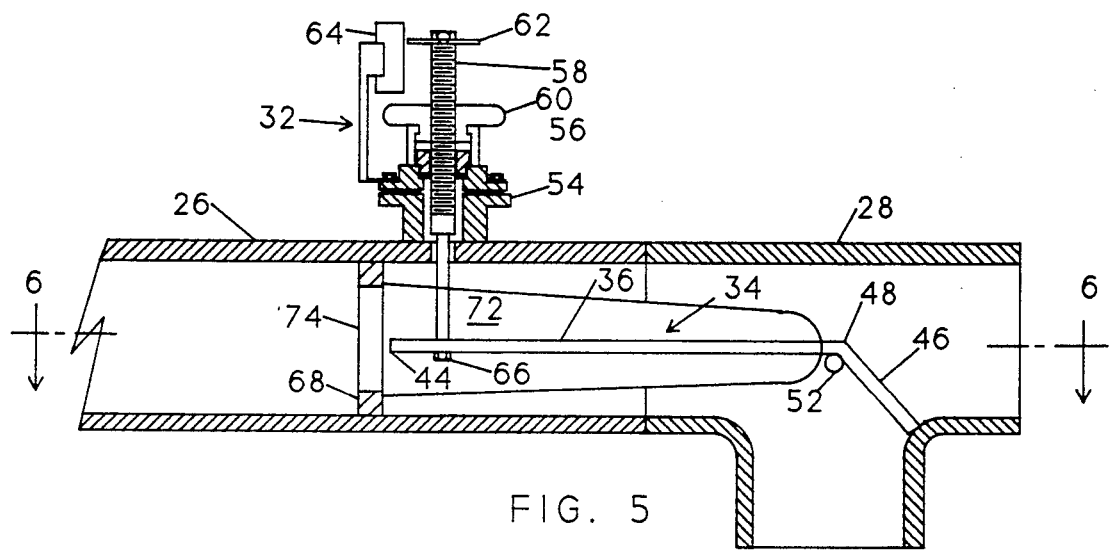
FIG. 5 is a vertical section, taken along line 5—5 of FIG. 6, showing an alternate embodiment of the present invention which does not require the installation of a static mixer.
Figure 6:
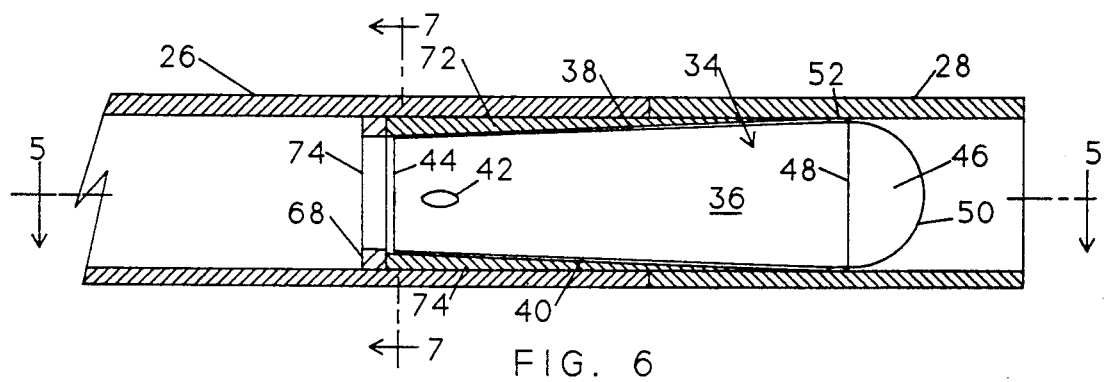
FIG. 6 is a horizontal section taken along line 6—6 of FIG. 5.
Figure 7:
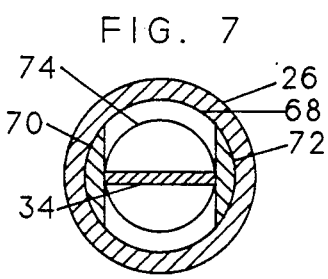
FIG. 7 is a transverse section taken along line 7—7 of FIG. 6.

FIGS. 5, 6 and 7 show an alternate embodiment of the present invention which obviates the requirement for the static mixer means 30 of the previous embodiment. In the absence of mixing means 30 (FIGS. 3 & 4) the liquid phase of the steam is distributed as a circumferential film in contact with the inner surface of inlet pipe 26. In the previous embodiment, the tapered edges 38, 40 of deflector plate 34 did not touch the walls of the inlet pipe 26 along most of their length, thereby creating a leak path such that the liquid phase of the steam could not be divided effectively by the deflector plate 34 alone. This leak path is effectively eliminated in the alternate embodiment by the addition of an orifice plate 68 fixedly attached transverse to the axis of the inlet pipe 26 immediately upstream of deflector plate 34. A pair of cylindrical wedges 70, 72 are fixedly attached to the inlet pipe 26 on both sides of deflector plate 34. The orifice plate 68 causes the liquid phase to break up prior to encountering the dividing means.

FIG. 7 shows the path available to the steam flow as it enters the inlet pipe 26. The deflector plate 34 in this embodiment is positioned using a the same mechanism as described with the previous embodiment. The elimination of the static mixing elements in the alternate embodiment is advantageous in that it allows operation with a substantially lower overall pressure drop.

The present invention may be subject to many modifications and changes which would occur to one skilled in the art without departing from the spirit or essential characteristics thereof. The above described embodiment should therefore be considered in all respects as illustrative and not restrictive of the scope of the invention as defined by the appended claims.

We claim:

1. An apparatus for equally distributing liquid and vapor phases of wet steam flowing through a T junction, said apparatus comprising:

a conduit member having upstream and downstream ends;

a T junction having an upstream branch connected to said conduit member and two downstream branches;

variable area dividing means pivotally mounted in said T junction about an axis substantially transverse to the plane defined by the axes of said T junction with a first end of said variable area dividing means extending generally toward said upstream branch and a second end extending generally toward one of said downstream branches; and means to adjust the position of said variable area dividing means with respect to the axis of said conduit member whereby distribution of the liquid and vapor phases through said junction is controlled.

2. The apparatus according to claim 1 wherein said variable area dividing means comprises:
a rigid plate with a first end extending generally axially of said upstream branch into said conduit member and a second end which is fixedly positioned at an angle with respect to said first end such that the fluid flow through the junction is divided between the two outlet branches; and
means intermediate said first and second ends pivotally mounting said plate in said junction.

3. The apparatus according to claim 1 wherein said means to control the setting of said variable area dividing means comprises:
screw means having a block fixed to said conduit member and a threaded shaft passing through said block into said conduit member;
means securing said variable area dividing means to said threaded shaft to be controlled thereby.

4. The apparatus according to claim 3 further comprising:
indicator means associated with said screw means to indicate the positioning of said variable area dividing means.

5. The apparatus according to claim 1 further comprising:
static mixer means mounted in said conduit member upstream of said dividing means.

6. The apparatus according to claim 5 further comprising:
wedge shaped members mounted in said conduit member to either side of said dividing means and downstream of said aperture plate whereby leak paths around said dividing means are substantially eliminated.

7. The apparatus according to claim 1 further comprising:
an aperture plate fixed in said conduit member upstream of said dividing means whereby annular fluid flow will broken up prior to encountering said dividing means.

* * * * *